US012347964B2

(12) United States Patent
Hou et al.

(10) Patent No.: US 12,347,964 B2
(45) Date of Patent: Jul. 1, 2025

(54) ELECTRICAL CONNECTOR WITH EMBEDDED INTEGRAL SHELL STRUCTURE

(71) Applicant: Advanced Connectek Inc., New Taipei (TW)

(72) Inventors: Pin-Yuan Hou, New Taipei (TW); Yubin Li, New Taipei (TW); Shu-Fen Wang, New Taipei (TW)

(73) Assignee: Advanced Connectek Inc., New Taipei (TW)

( * ) Notice: Subject to any disclaimer, the term of this patent is extended or adjusted under 35 U.S.C. 154(b) by 409 days.

(21) Appl. No.: 17/954,337

(22) Filed: Sep. 28, 2022

(65) Prior Publication Data

US 2023/0104592 A1 Apr. 6, 2023

(30) Foreign Application Priority Data

Oct. 4, 2021 (CN) .......................... 202111167310.9

(51) Int. Cl.
*H01R 13/52* (2006.01)
*H01R 13/6581* (2011.01)
*H01R 24/60* (2011.01)

(52) U.S. Cl.
CPC ..... *H01R 13/5202* (2013.01); *H01R 13/6581* (2013.01); *H01R 24/60* (2013.01)

(58) Field of Classification Search
None
See application file for complete search history.

(56) References Cited

U.S. PATENT DOCUMENTS

2016/0093974 A1* 3/2016 Lai ........................ H01R 13/521 439/736
2017/0229823 A1* 8/2017 Tsai ...................... H01R 13/516
2018/0151978 A1* 5/2018 Zhao .................. H01R 13/6582
2018/0175543 A1* 6/2018 Zhao .................. H01R 13/5219
2020/0091659 A1* 3/2020 Tada .................... H01R 13/502

* cited by examiner

*Primary Examiner* — Oscar C Jimenez
(74) *Attorney, Agent, or Firm* — JCIPRNET

(57) ABSTRACT

An electrical connector including an insulating body, multiple terminals, a shell, and a sealing adhesive is provided. The terminals are disposed in the insulating body. The shell is assembled to the insulating body. The shell has an insulative exterior shell, surrounding the insulating body and the terminals. Portions of the insulating body and the terminals protruding from a front side of the insulative exterior shell are configured to be connected to another electrical connector. The sealing adhesive is filled between the shell and the insulating body and located at a rear side of the insulative exterior shell.

19 Claims, 7 Drawing Sheets

ELECTRICAL CONNECTOR WITH EMBEDDED INTEGRAL SHELL STRUCTURE

CROSS-REFERENCE TO RELATED APPLICATION

This application claims the priority benefit of China application serial no. 202111167310.9, filed on Oct. 4, 2021. The entirety of the above-mentioned patent application is hereby incorporated by reference herein and made a part of this specification.

BACKGROUND

Technical Field

The disclosure relates to an electrical connector.

Description of Related Art

With the development of electronic products towards ultra-thin types and miniaturization, the structure of electrical connectors is getting smaller and smaller. Therefore, how to ensure the waterproof and high frequency characteristics of the electrical connectors has become an important challenge.

In order to ensure the waterproof performance of the electrical connector, the waterproof outer casing of the existing electrical connector is made of a metal material by drawing. However, due to the complicated drawing process and considerable difficulty, the manufacturing cost of such a waterproof outer casing cannot be effectively reduced.

SUMMARY

The disclosure provides an electrical connector, which can simplify the manufacturing process and reduce the cost by a shell made of an insulative exterior shell.

The electrical connector of the disclosure include an insulating body, multiple terminals, a shell, and a sealing adhesive. The terminals are disposed in the insulating body. The shell is assembled to the insulating body. The shell has an insulative exterior shell, surrounding the insulating body and the terminals. Portions of the insulating body and the terminals protruding from a front side of the insulative exterior shell are configured to be connected to another electrical connector. The sealing adhesive is filled between the shell and the insulating body and located at a rear side of the insulative exterior shell.

In an exemplary example, the above-mentioned shell further has an interior member. The interior member has a retaining wall, the retaining wall protrudes from an inner wall of the insulative exterior shell, and the front side surface of the insulating body presses against the retaining wall.

In an exemplary example, the above-mentioned interior member and the insulative exterior shell are an integral structure.

In an exemplary example, the above-mentioned insulative exterior shell is a plastic structure, the interior member is a metallic structure, and the metallic structure is embedded into the plastic structure.

In an exemplary example, the above-mentioned interior member further has multiple retaining portions, protruding from the insulative exterior shell and bendingly pressing against the rear side surface of the insulating body, so as to fix the insulating body and the shell together.

In an exemplary example, the above-mentioned insulating body includes a tongue portion, a partition portion, and a rear plate. The partition portion has the aforementioned front side surface and the rear side surface. The tongue portion and the rear plate extend away from each other from the front side surface and the rear side surface, respectively, and the terminals each extend from the rear plate through the partition portion to and are partially exposed to the tongue portion. Part of the tongue portion protrudes from the front side of the insulative exterior shell, the rear plate protrudes from the rear side of the insulative exterior shell, and the partition portion is fastened between the retaining wall and the retaining portions.

In an exemplary example, a space is formed between the rear side surface of the above-mentioned partition portion, part of the inner wall of the insulative exterior shell, and the rear plate, and the sealing adhesive is filled in the space.

In an exemplary example, the above-mentioned electrical connector further includes a rear cover plate, covering and being fastened to the rear plate, and the sealing adhesive is located between the rear side surface of the partition portion and the rear cover plate.

In an exemplary example, the above-mentioned electrical connector further includes a sealing ring, assembled to the front side of the insulative exterior shell, and the sealing ring is configured to press against the another electrical connector.

In an exemplary example, the above-mentioned electrical connector is a universal serial bus (USB) Type-C electrical receptacle connector.

Based on the above, the electrical connector surrounds the insulating body and the terminals by the shell with the insulative exterior shell, and at the same time, the sealing adhesive is filled between the shell and the insulating body. Moreover, the sealing adhesive is located at the rear side of the insulative exterior shell, so that the spaces where the front and rear ends of the insulating body are located are isolated, and the spaces where the front and rear ends of each of the terminals are located are also isolated. Thus, the IPX8 waterproof rating may be achieved.

DESCRIPTION OF THE EMBODIMENTS

Figure 1:
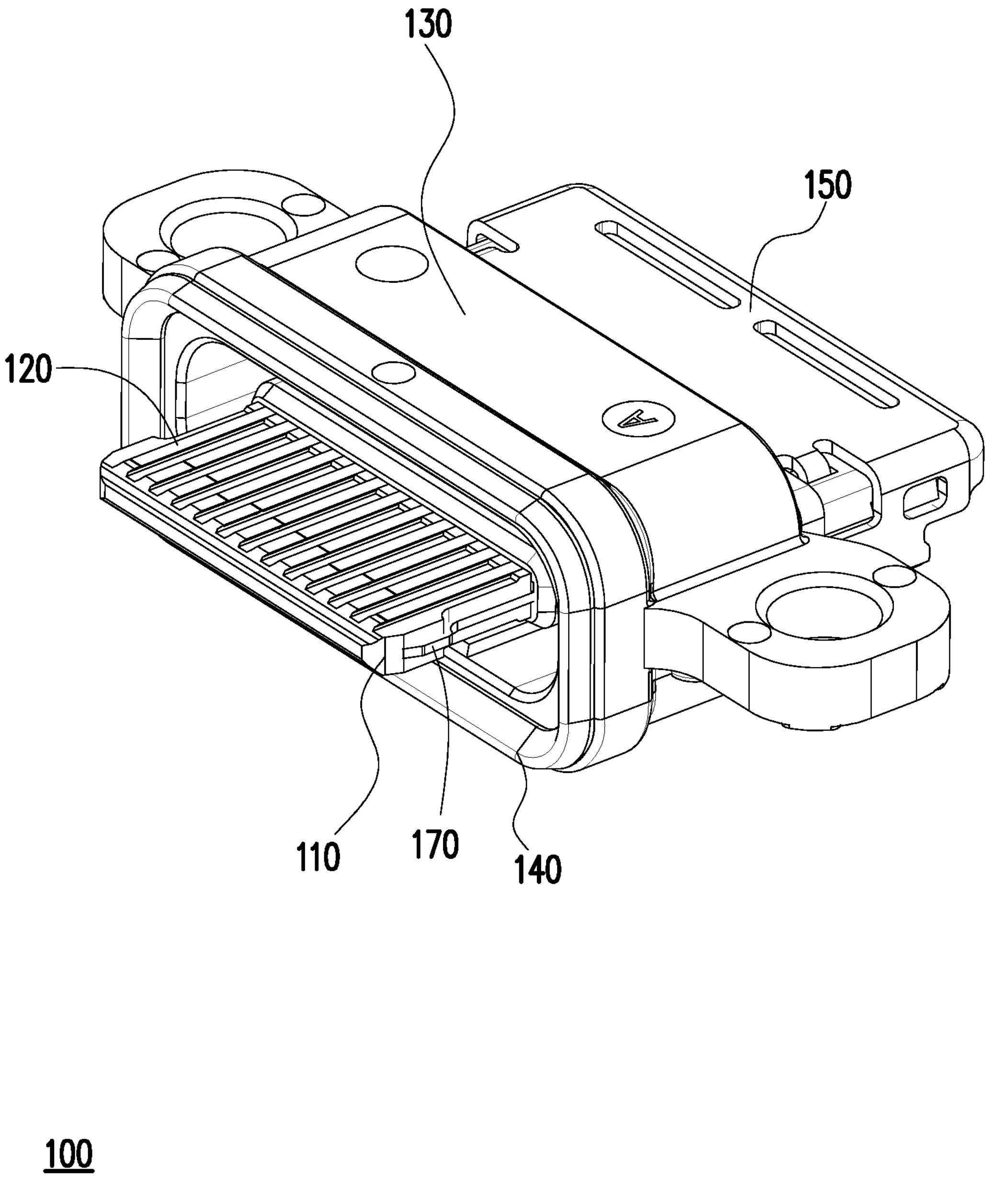
FIG. 1 is a schematic diagram of an electrical connector according to an embodiment of the disclosure.
Figure 2:
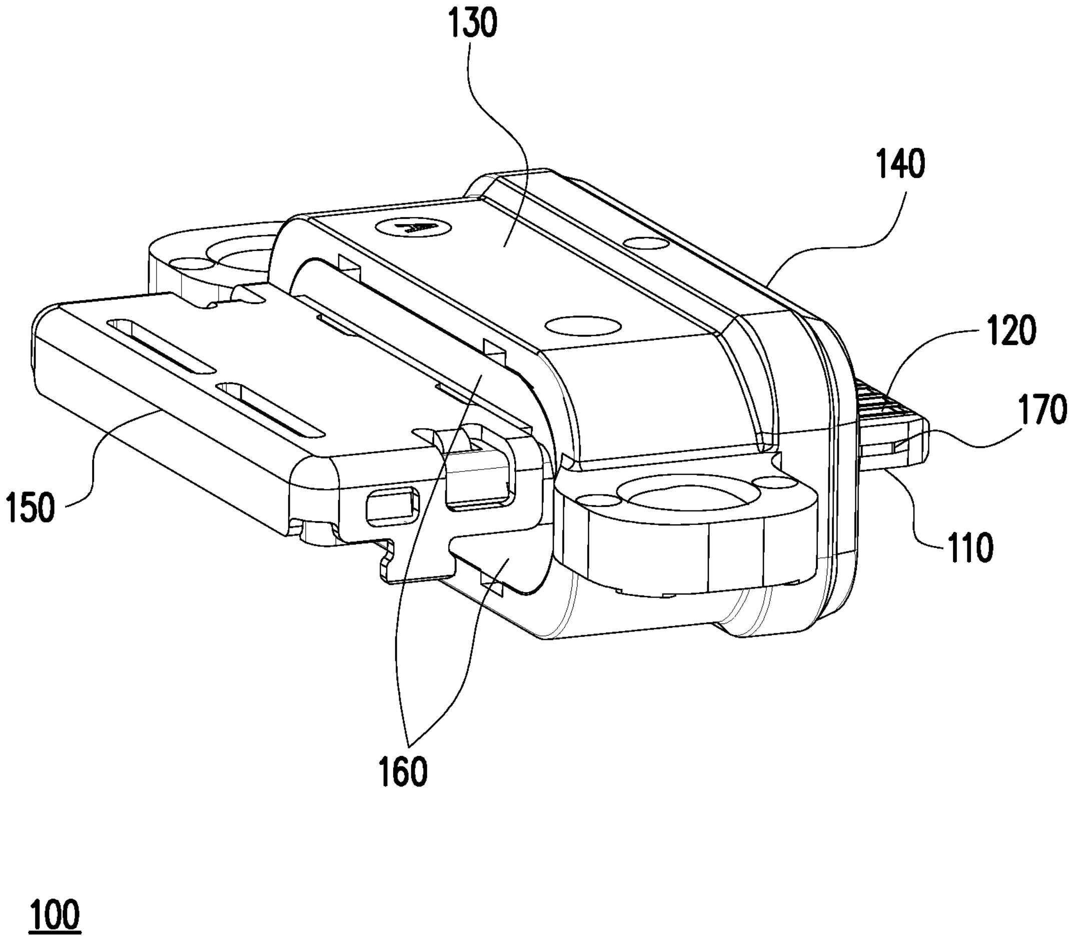
FIG. 2 illustrates the electrical connector of FIG. 1 from another perspective.
Figure 3:
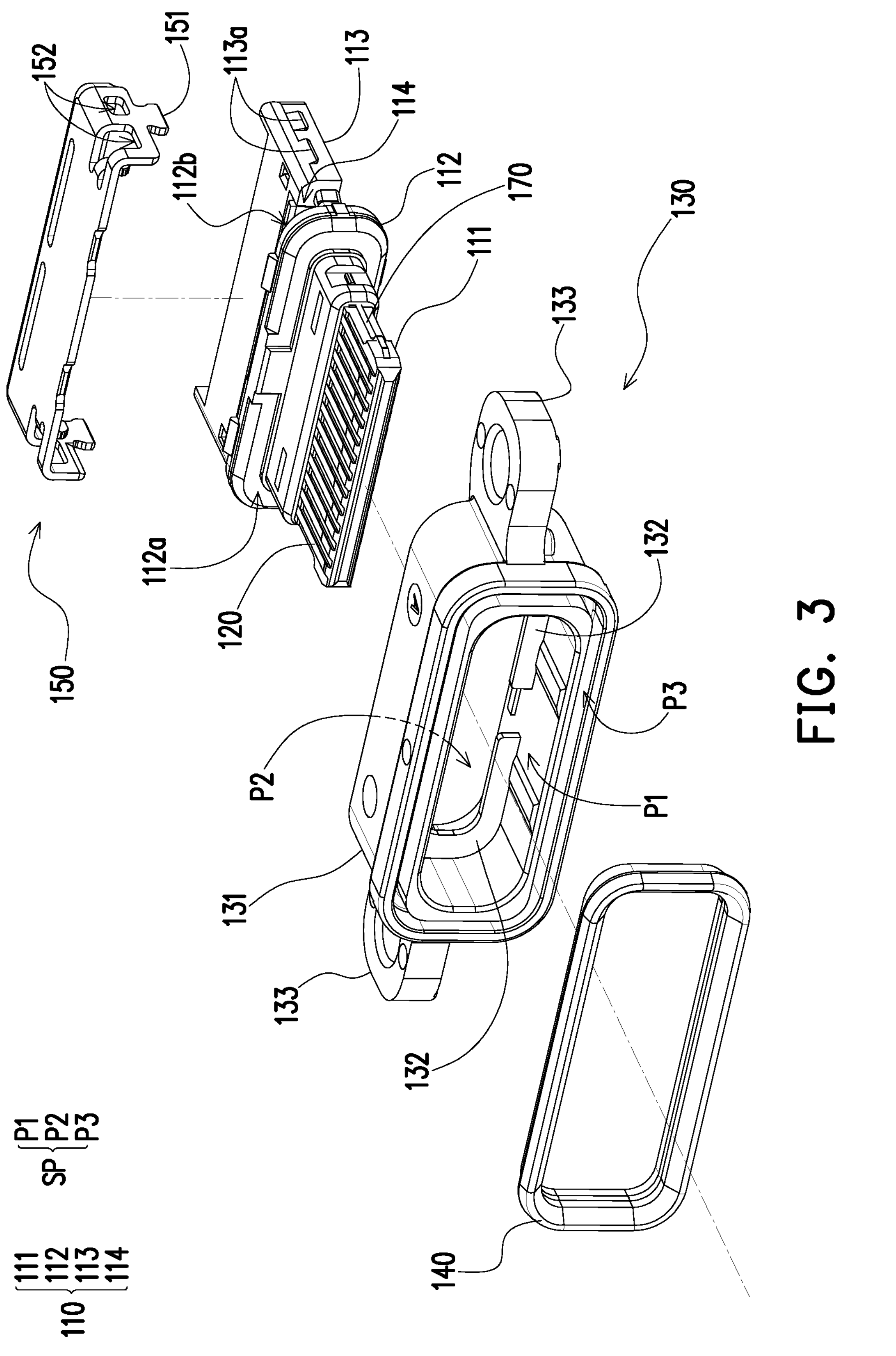
FIG. 3 is an exploded view of the electrical connector of FIG. 1.

FIG. 1 is a schematic diagram of an electrical connector according to an embodiment of the disclosure. FIG. 2 illustrates the electrical connector of FIG. 1 from another perspective. FIG. 3 is an exploded view of the electrical connector of FIG. 1. Please refer to FIGS. 1 to 3 at the same time. In the embodiment, an electrical connector 100, such as a universal serial bus (USB) Type-C electrical receptacle connector, includes an insulating body 110, multiple terminals 120, a shell 130, a sealing ring 140, a rear cover plate 150, a sealing adhesive 160 and a mid-plate 170. The terminals 120 are disposed in the insulating body 110. The shell 130 is assembled to the insulating body 110, so that the insulating body 110 and the terminals 120 are in a state of passing through the shell 130. The sealing ring 140 is assembled to the shell 130. The rear cover plate 150 is assembled to the insulating body 110.

Figure 4:
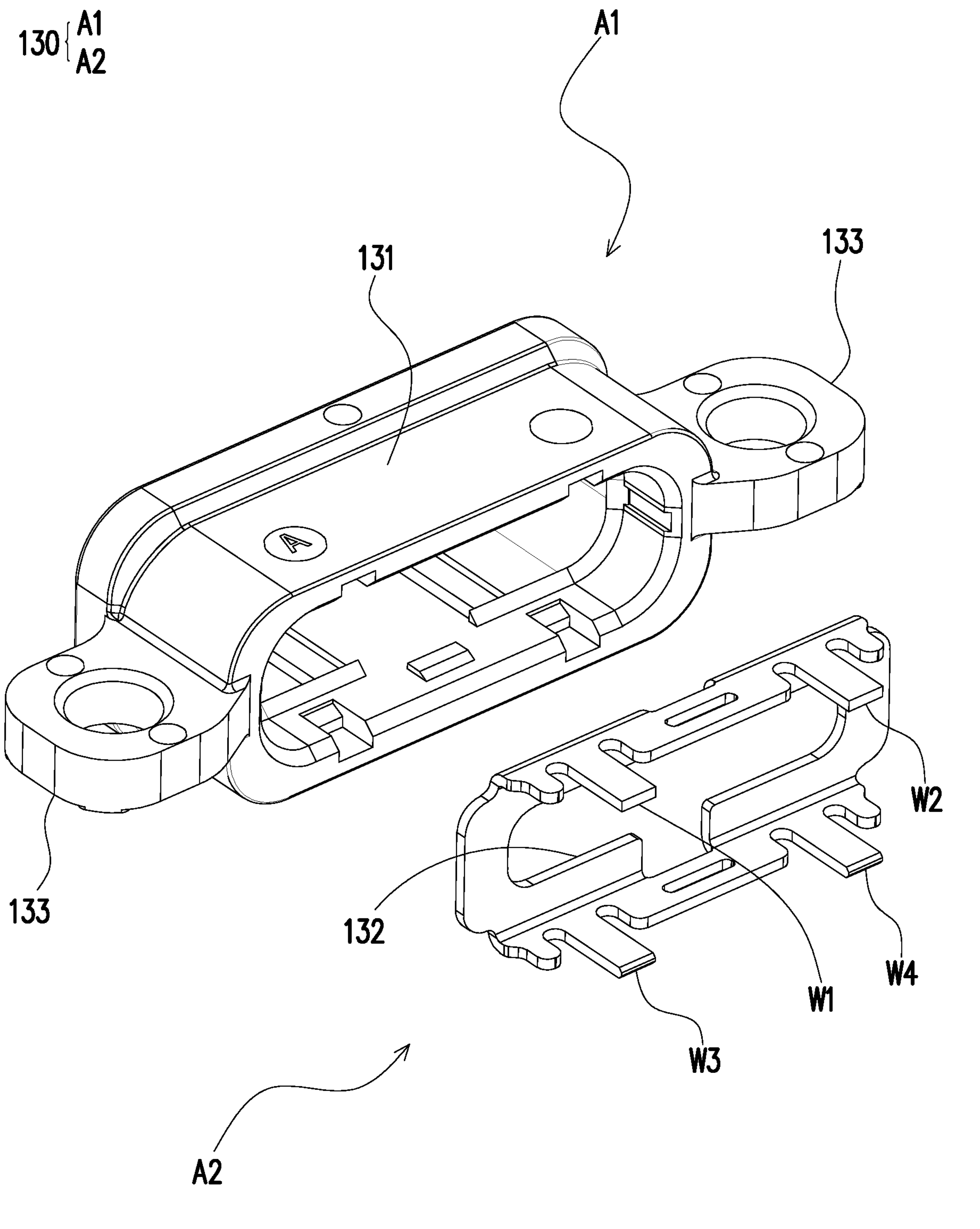
FIG. 4 is a schematic diagram of some components of the electrical connector of FIG. 1.

FIG. 4 is a schematic diagram of some components of the electrical connector of FIG. 1. Please refer to FIGS. 3 and 4 at the same time. In the embodiment, the shell 130 includes an insulative exterior shell A1 and an interior member A2, and the insulative exterior shell A1 surrounds the insulating body 110 and the terminals 120. Portions of the insulating body 110 and the terminals 120 protruding from the front side of the insulative exterior shell A1 are configured to be connected to another electrical connector (not shown), and the aforementioned sealing ring 140 presses against the another electrical connector during the connection. Meanwhile, comparing with FIG. 2, the sealing adhesive 160 is filled between the shell 130 and the insulating body 110 and is located at a rear side of the insulative exterior shell A1. The interior member A2 has a retaining wall 132, the retaining wall 132 protrudes from the inner wall of the insulative exterior shell A1, and a front side 112*a* of the insulating body 110 presses against the retaining wall 132.

Further, the insulative exterior shell A1 and the interior member A2 of the embodiment are an integral structure, and in particular, the insulative exterior shell A1 is a plastic structure, which is, for example, injection-molded by a nylon material, especially PA4T, and the interior member A2 is a metallic structure. Therefore, the metallic structure of the interior member A2 can be embedded into the plastic structure of the insulative exterior shell A1 through the insert molding process. The interior member A2 can not only strengthen the structural strength of the insulative exterior shell A1, but also provide a bonding function between the shell 130 and the insulating body 110, which is to be described in detail later.

Figure 5:
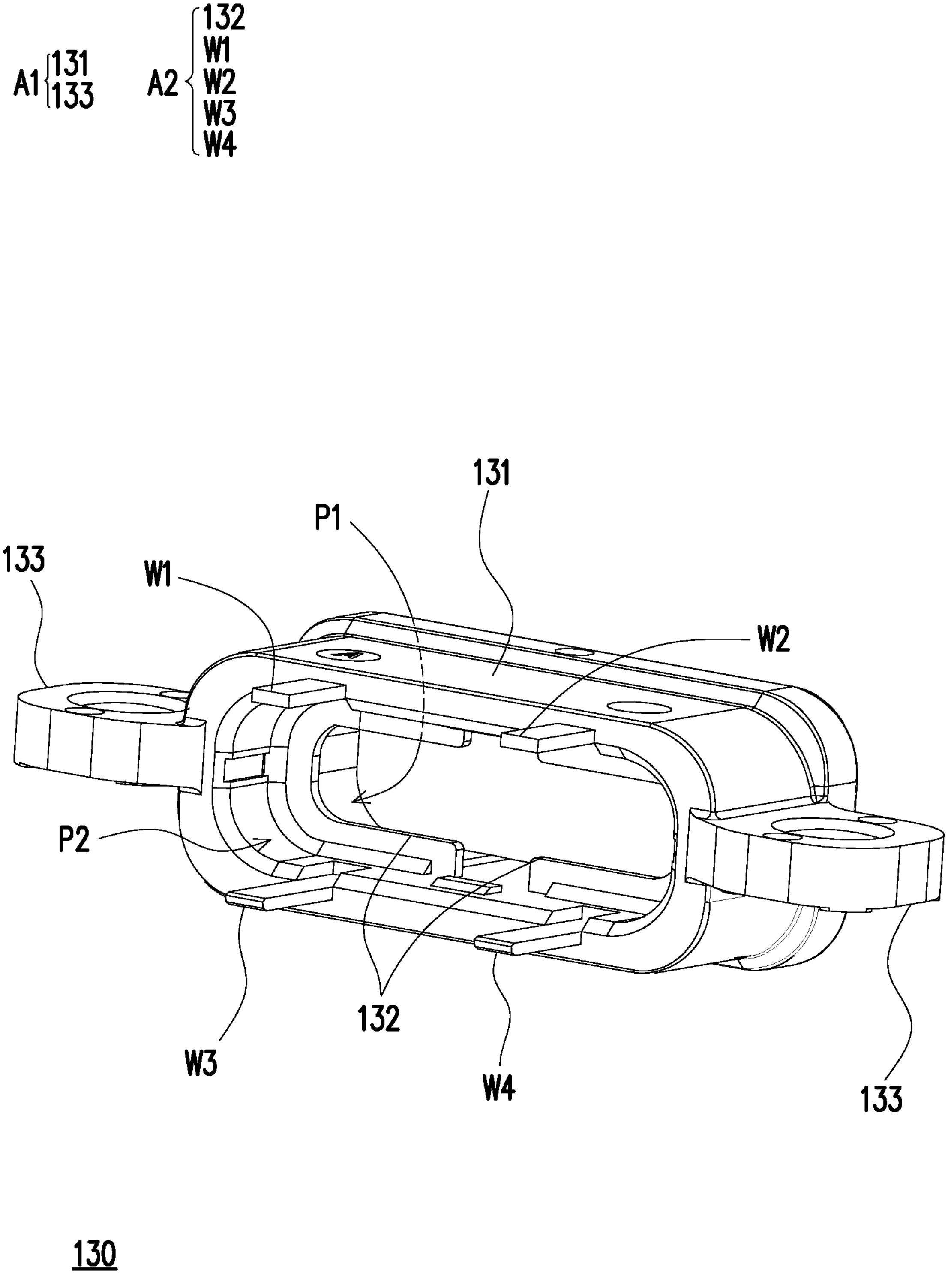
FIG. 5 is a schematic diagram of the components of FIG. 4 after being combined.
Figure 6:
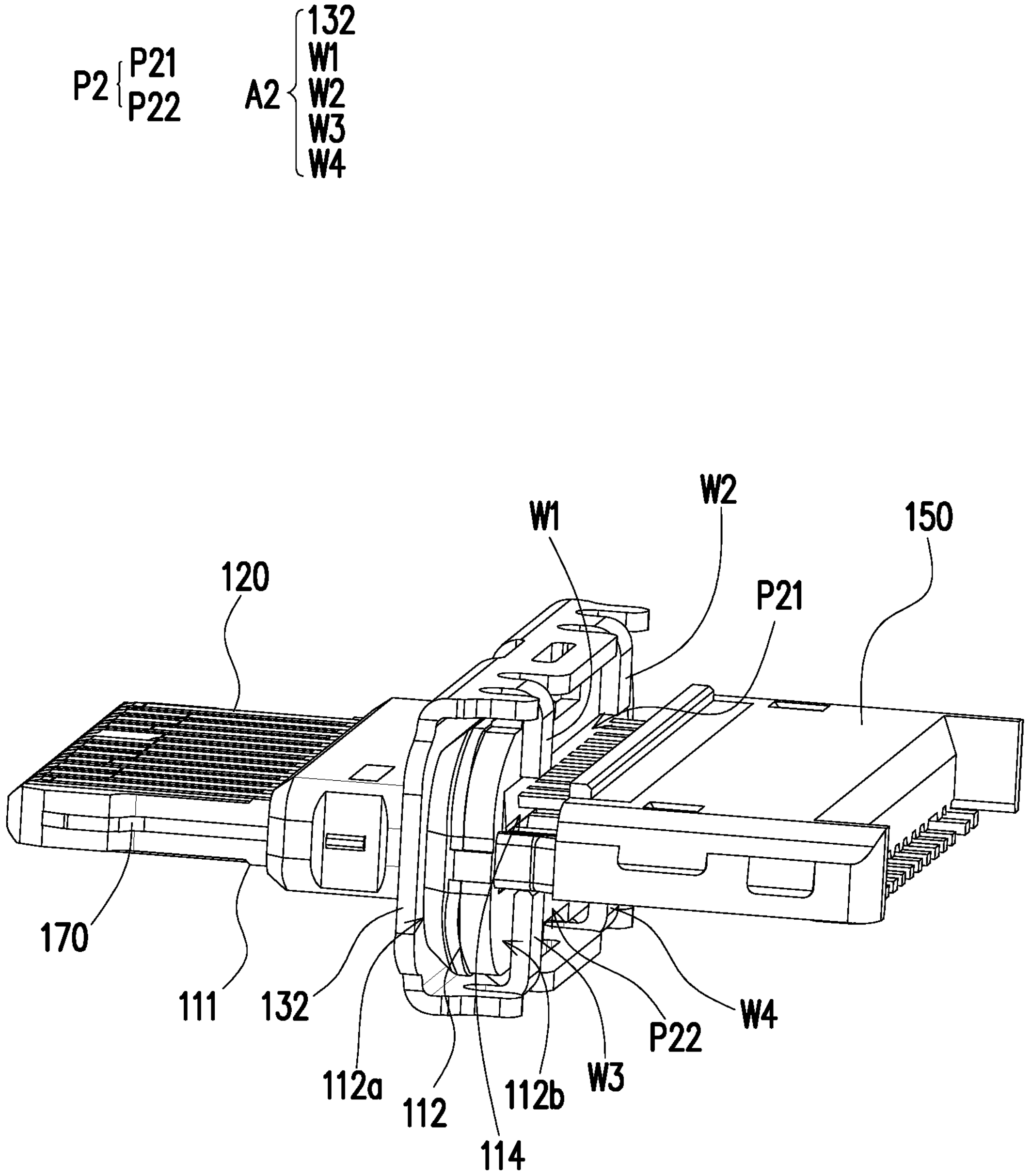
FIG. 6 is a schematic diagram of some components of the electrical connector of FIG. 1.

FIG. 5 is a schematic view of the components of FIG. 4 after being combined, which is equivalent to showing the shell 130 shown in FIG. 3 from another perspective. FIG. 6 is a schematic diagram of some components of the electrical connector of FIG. 1, and the insulative exterior shell A1 of the shell 130 is omitted here to facilitate the identification of the relative relationship between the interior member A2 and the insulating body 110. Please refer to FIGS. 3 to 5 first. In the embodiment, the insulating body 110 includes a tongue portion 111, a partition portion 112 and a rear plate 113. The mid-plate 170 is located between a top surface of the tongue portion 111 and a down surface of the tongue portion 111. Two side surfaces of the mid-plate 170 are exposed out two side surfaces of the tongue portion 111 respectively. The partition portion 112 has a front side surface 112*a* and a rear side surface 112*b*. The tongue portion 111 and the rear plate 113 extend away from each other from the front side surface 112*a* and the rear side surface 112*b*, respectively, and the terminals 120 each extend from the rear plate 113 through the partition portion 112 to and are partially exposed to the tongue portion 111. As shown in FIG. 6, the insulating body 110 has a groove 114 located between the partition portion 112 and the rear plate 113. The partition portion 112 is located in front of the groove 114 and the rear plate 113 is located behind the groove 114. Connection portions of the terminals 120 are exposed in the groove 114. Part of the tongue portion 111 protrudes from the front side of the insulative exterior shell A1, and the rear plate 113 protrudes from the rear side of the insulative exterior shell A1, as shown in the aforementioned FIGS. 1 and 2.

Furthermore, the aforementioned rear cover plate 150 is covered and fastened to the rear plate 113. The rear cover plate 150 is a metallic rear cover plate. As shown in FIG. 3, the rear plate 113 has multiple buckle portions 113*a*, such as buckle protrusions, and the rear cover plate 150 has multiple buckle portions 152, such as buckle grooves. The rear cover plate 150 and the rear plate 113 can be assembled together by the respective buckle portions being correspondingly buckled with each other. The form of the buckle portions 113*a* and 152 is not limited in the disclosure. In another non-illustrated embodiment, the buckle portions 113*a* may also be buckle grooves, and the buckle portions 152 may also be buckle protrusions. The rear cover plate 150 of the embodiment further has a protruding portion 151. As the aforementioned electrical connector 100 is an electrical receptacle connector, the protruding portion 151 is configured to be inserted into a circuit board (not shown), which can not only provide a positioning effect, but also generate a grounding effect according to the electrical conduction of the grounding pads of the circuit board. In addition, a pair of lateral wings 133 extend from the insulative exterior shell A1 of the shell 130, and are configured to be fixed together with the aforementioned circuit board by means of locking attachments (e.g., screws or rivets).

Moreover, the insulative exterior shell A1 of the embodiment is a ring-shaped component, and has an accommodating area SP. The accommodating area SP includes an annular groove P3 and spaces P1 and P2. The annular groove P3 is configured to assemble the sealing ring 140, that is, the sealing ring 140 is assembled to the front side of the insulative exterior shell A1. When the interior member A2 is embedded in the insulative exterior shell A1, the retaining wall 132 protrudes from the inner wall of the insulative exterior shell A1, thereby separating part of the accommodating area SP in the insulative exterior shell A1, as shown in FIG. 3. Moreover, the spaces P1 and P2 of the accommodating area SP is separated by the retaining wall 132, the space P1 is located at the front side of the insulative exterior shell A1, and the space P2 is located at the rear side of the insulative exterior shell A1.

Please refer to FIGS. 4 and 5 at the same time and compare with FIG. 6. In the embodiment, the interior member A2 further has multiple retaining portions W1 to W4. The retaining portions W1 to W4 respectively protrude from the insulative exterior shell A1 and bendingly press against the rear side surface 112*b* of the insulating body 110 to fix the insulating body 110 and the shell 130 together. In detail, as the aforementioned interior member A2 is a metallic structure, the interior member A2 naturally has deformable physical properties. As shown in FIG. 4, the interior member A2 of the embodiment is stamped from a metal rear cover plate and includes the retaining wall 132 located in the middle and in an annular shape, and the protruding structure extending from the retaining wall 132. In addition to the aforementioned retaining portions W1 to W4, the remainder of the protruding structure is configured to improve the bonding degree of the components when the interior member A2 is insert-molded into the insulative exterior shell A1.

The combined shell 130 is shown in FIG. 5. The retaining portions W1 to W4 protrude from the insulative exterior shell A1. Therefore, when the insulating body 110, the terminals 120, and the rear cover plate 150 are assembled and connected with the shell 130, as shown in FIG. 6, the retaining wall 132 presses against the front side surface 112*a* of the partition portion 112, and then the retaining portions W1 to W4 are relatively bent and press against the rear side surface 112*b* of the partition portion 112, so that the partition portion 112 can be fastened between the retaining wall 132 and the retaining portions W1 to W4, and the fixing process of the shell 130 and the insulating body 110 is completed.

Figure 7:
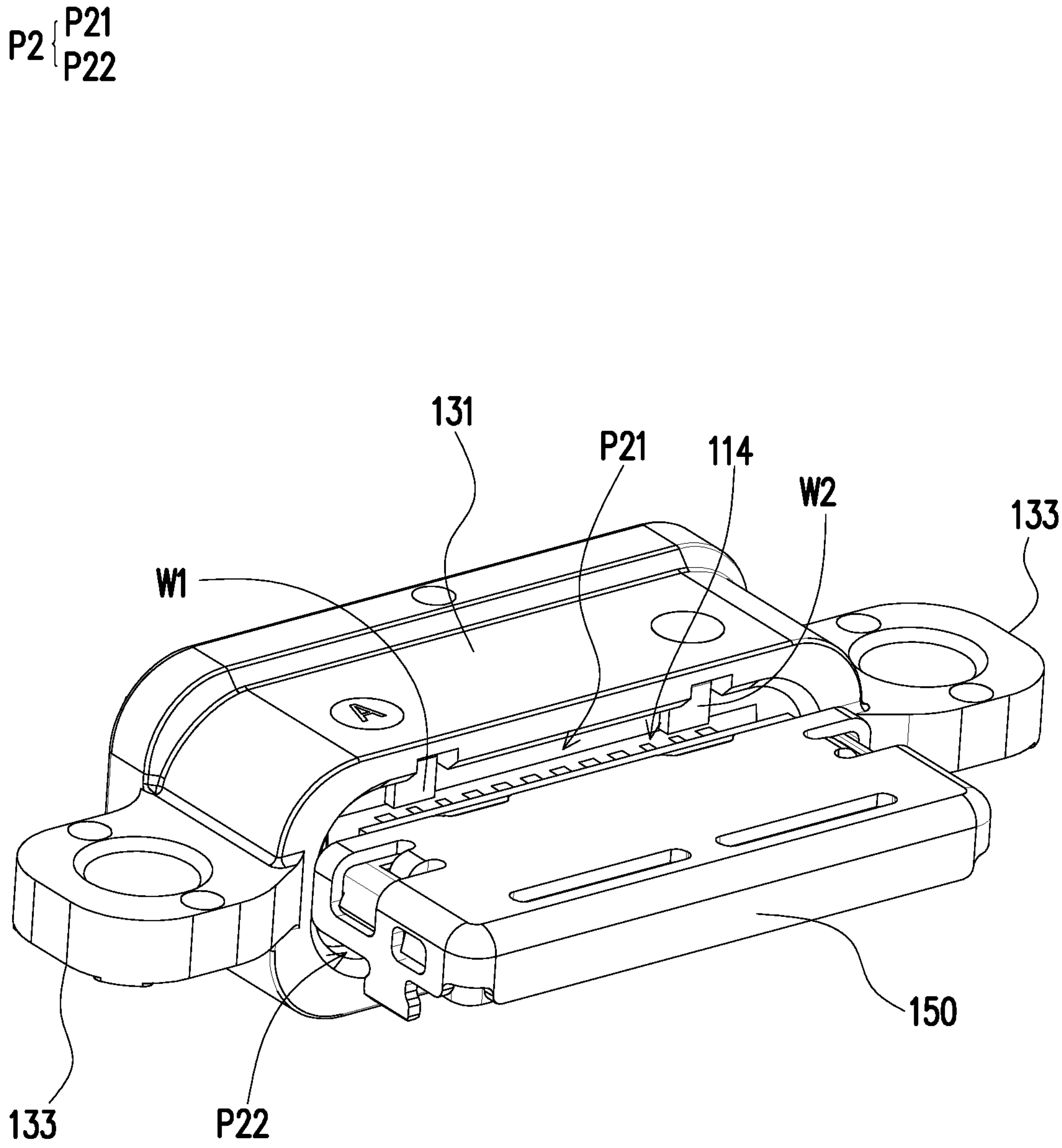
FIG. 7 is a schematic diagram of some components of the electrical connector of FIG. 1.

FIG. 7 is a schematic diagram of some components of the electrical connector of FIG. 1. Please refer to FIGS. 6 and 7 at the same time and compare with FIG. 2. After the shell 130 and the insulating body 110 are assembled, the space P2 is formed between the rear side surface 112*b* of the partition portion 112, part of the inner wall of the insulative exterior shell A1, and the rear plate 113 (covered by the rear cover plate 150). As shown in FIG. 7, the space P2 may be divided into subspaces P21 and P22 which are opposite to each other and communicate with each other. Thus, the above-mentioned sealing adhesive 160 can be filled in the space P2 (the subspaces P21 and P22) and the groove 114. In this way, in addition to bonding related components, an isolation effect can further be produced, that is, the spaces where the front and rear ends of the insulating body 110 are located are isolated (equivalent to the situation where the spaces where the front and rear ends of each of the terminals 120 are located are isolated). Meanwhile, please compare FIG. 2 with FIG. 7. The sealing adhesive 160 is located between the rear side surface 112*a* of the partition portion 112 and the rear cover plate 150.

In summary, in the above-mentioned embodiments of the disclosure, the electrical connector surrounds the insulating body and the terminals by the shell with the insulative exterior shell, and at the same time, the sealing adhesive is filled between the shell and the insulating body. Moreover, the sealing adhesive is located at the rear side of the insulative exterior shell, so that the spaces where the front and rear ends of the insulating body are located are isolated, and the spaces where the front and rear ends of each of the terminals are located are also isolated, thereby achieving the IPX8 waterproof rating.

More specifically, the shell is composed of the insulative exterior shell and the interior member that are embedded with each other. The insulative exterior shell is made of plastic injection molding, and the complex process and manufacturing cost of drawing the metal casing in the prior art can be effectively overcome. At the same time, the interior member of the metallic structure is disposed, so that the structural strength of the shell can be improved, and the combination structure of the shell and the insulating body is provided. Furthermore, after the shell and the insulating body are combined, a space is formed between the rear side surface of the partition portion of the insulating body, the part of the inner wall of the insulative exterior shell, and the rear plate of the insulating body, and the space is filled with the sealing adhesive. Therefore, the sealing effect of the aforementioned space isolation is successfully achieved.

What is claimed is:

1. An electrical connector, comprising:

an insulating body;

a plurality of terminals, disposed in the insulating body;

a shell, assembled to the insulating body, the shell having an insulative exterior shell, surrounding the insulating body and the plurality of terminals, and portions of the insulating body and the plurality of terminals protruding from a front side of the insulative exterior shell being configured to be connected to another electrical connector; and a sealing adhesive, filled between the shell and the insulating body and located at a rear side of the insulative exterior shell, wherein the shell further has an interior member, the interior member has a retaining wall, the retaining wall protrudes from an inner wall of the insulative exterior shell, and a front side surface of the insulating body presses against the retaining wall, wherein the interior member further has a plurality of retaining portions, protruding from the insulative exterior shell and bendingly pressing against a rear side surface of the insulating body, so as to fix the insulating body and the shell together, wherein the interior member further has a plurality of protrusions interlaced adjacent to the retaining portions and inserted into a wall structure of the insulative exterior shell, the protrusions and the retaining portions are consistent with each other and bending relative to the retaining wall.

2. The electrical connector according to claim 1, wherein the interior member and the insulative exterior shell are an integral structure.

3. The electrical connector according to claim 1, wherein the insulative exterior shell is a plastic structure, the interior member is a metallic structure, and the metallic structure is embedded into the plastic structure.

4. The electrical connector according to claim 1, wherein the insulating body comprises a tongue portion, a partition portion, and a rear plate, the partition portion has the front side surface and the rear side surface, the tongue portion and the rear plate extend away from each other from the front side surface and the rear side surface, respectively, and the plurality of terminals each extend from the rear plate through the partition portion to and are partially exposed to the tongue portion, part of the tongue portion protrudes from the front side of the insulative exterior shell, the rear plate protrudes from the rear side of the insulative exterior shell, and the partition portion is fastened between the retaining wall and the plurality of retaining portions.

5. The electrical connector according to claim 4, wherein a space is formed between the rear side surface of the partition portion, part of the inner wall of the insulative exterior shell, and the rear plate, and the sealing adhesive is filled in the space.

6. The electrical connector according to claim 4, further comprising:

a rear cover plate, covering and being fastened to the rear plate, and the sealing adhesive being located between the rear side surface of the partition portion and the rear cover plate.

7. The electrical connector according to claim 1, further comprising:

a sealing ring, assembled to the front side of the insulative exterior shell, and the sealing ring being configured to press against the another electrical connector.

8. The electrical connector according to claim 1, wherein the electrical connector is a universal serial bus (USB) Type-C electrical receptacle connector.

9. The electrical connector according to claim 1, wherein the interior member keeps a distance from a front window of the insulative exterior shell to form a retracted structure relative to the insulative exterior shell, and the interior member is away from an insertion space formed by the tongue portion of the insulative body and the insulative exterior shell for mating with the another electrical connector.

10. An electrical connector, comprising:

an insulating body;

a plurality of terminals, disposed in the insulating body;

a shell, assembled to the insulating body, the shell comprising:

an insulative exterior shell surrounding the insulating body and the plurality of terminals, and portions of the insulating body and the plurality of terminals protruding from a front side of the insulative exterior shell being configured to be connected to another electrical connector; and an interior member having a retaining wall, wherein the interior member is a metallic structure, the metallic structure is embedded into a plastic structure, and the retaining wall protrudes from an inner wall of the insulative exterior shell, and a front side surface of the insulating body presses against the retaining wall; and a sealing adhesive, filled between the shell and the insulating body and located at a rear side of the insulative exterior shell, wherein the interior member further has a plurality of protrusions bending relative to the retaining wall and embedded within a wall structure of the plastic structure.

11. The electrical connector according to claim 10, wherein the interior member further has a plurality of retaining portions, protruding from the insulative exterior shell and bendingly pressing against a rear side surface of the insulating body, so as to fix the insulating body and the shell together.

12. The electrical connector according to claim 11, wherein the insulating body comprises a tongue portion, a partition portion, and a rear plate, the partition portion has the front side surface and the rear side surface, the tongue portion and the rear plate extend away from each other from the front side surface and the rear side surface, respectively, and the plurality of terminals each extend from the rear plate through the partition portion to and are partially exposed to the tongue portion, part of the tongue portion protrudes from the front side of the, the rear plate protrudes from the rear side of the, and the partition portion is fastened between the retaining wall and the plurality of retaining portions.

13. The electrical connector according to claim 12, wherein a space is formed between the rear side surface of the partition portion, part of the inner wall of the insulative exterior shell, and the rear plate, and the sealing adhesive is filled in the space.

14. The electrical connector according to claim 12, further comprising:

a rear cover plate, covering and being fastened to the rear plate, and the sealing adhesive being located between the rear side surface of the partition portion and the rear cover plate.

15. The electrical connector according to claim 12, wherein the insulating body has a groove located between the partition portion and the rear plate, connection portions of the terminals are exposed in the groove and the sealing adhesive is filled in the groove.

16. The electrical connector according to claim 15, wherein the partition portion is located in front of the groove and the rear plate is located behind the groove.

17. The electrical connector according to claim 10, further comprising:

a sealing ring, assembled to the front side of the, and the sealing ring being configured to press against the another electrical connector.

18. The electrical connector according to claim 10, wherein the electrical connector is a universal serial bus (USB) Type-C electrical receptacle connector.

19. The electrical connector according to claim 10, wherein the interior member keeps a distance from a front window of the insulative exterior shell to form a retracted structure relative to the insulative exterior shell, and the interior member is away from an insertion space formed by the tongue portion of the insulative body and the insulative exterior shell for mating with the another electrical connector.

* * * * *